May 6, 1924.
M. A. JOHNSON
1,492,853
SAFETY PIN
Filed Sept. 13, 1922
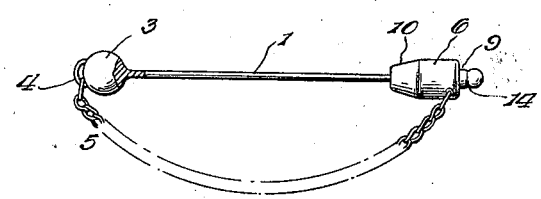
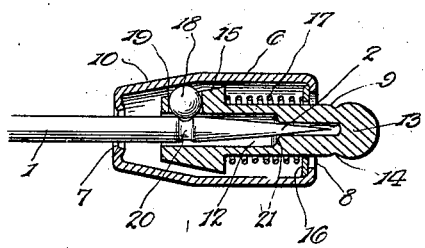 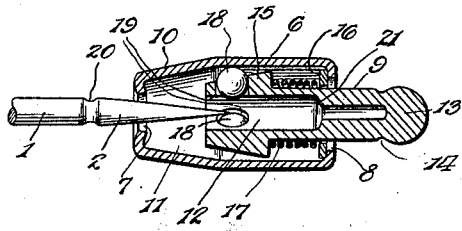
Inventor
M. A. Johnson.
By
Lacey & Lacey, Attorneys Patented May 6, 1924.

1,492,853

UNITED STATES PATENT OFFICE.

MAGNUS A. JOHNSON, OF DENVER, COLORADO.

SAFETY PIN.

Application filed September 13, 1922. Serial No. 588,055.

*To all whom it may concern:*

Be it known that I, MAGNUS A. JOHNSON, a citizen of the United States, residing at Denver, in the county of Denver and State of Colorado, have invented certain new and useful Improvements in Safety Pins, of which the following is a specification.

This invention relates to safety pins and has for its object the provision of a safety pin of novel construction whereby release of the pin from the article in which it is engaged will be prevented and the point of the pin guarded so that injury to persons using the article will be avoided. The invention seeks to provide a device which will be attractive in appearance and which will normally hold the pin in secure engagement with the article fastened by it but which may be readily released when the pin is to be removed from the article. The invention is illustrated in the accompanying drawings and will be hereinafter fully set forth.

In the drawings—

Figure 1 is an elevation of a safety pin constructed in accordance with my present invention;

Figs. 2 and 3 are enlarged longitudinal sections through the keeper or guard, Fig. 2 showing the pin secured and Fig. 3 showing the parts arranged to permit release of the pin.

The pin 1 is of the usual circular cross sectional form and is provided with a tapered or sharpened point 2, as will be readily understood. The head of the pin may be of any desired design, and in the accompanying drawings I have shown a head 3 of spherical form and of considerably greater diameter than the shank or stem of the pin. An eye or loop 4 is formed on or secured to the head and a guard retainer 5 which will preferably be in the form of a more or less ornamental chain is engaged in and held by this eye or loop. The guard or keeper is secured to the said chain 5 and comprises a casing 6 of a general cylindrical formation, the said casing being attached directly to the chain, as shown clearly in Fig. 1. This casing 6 has open ends, as shown at 7 and 8 respectively, whereby it may fit around the point of the pin and around the guard 9. The inner end of the casing, by which term is meant the end presented toward the head of the pin, is slightly tapered, as shown at 10, thereby presenting an internal wedging surface 11, as will be presently more particularly referred to. Disposed axially within the casing and projecting through the outer end of the same is the guard 9 which has a central bore 12 to receive the point 2 of the pin, the diameter of the outer portion of the bore being less than the diameter of the inner portion so that an internal annular shoulder 21 is formed within the guard between its end. The tapered portion of the pin will engage this shoulder, as shown in Fig. 2, so that the penetration of the pin will be limited and the point can not come into contact with the closed end of the guard and be thereby bent or dulled. The outer end of the guard is closed, as shown at 13, so that the pin point cannot prick the user who may be handling the article in which the pin is engaged, and upon the exterior of the guard is an annular groove 14 which facilitates the grasping of the guard in the operation of the device. The guard is constructed with an annular enlargement or head 15 at its inner end and between the said head and a washer 16 within the casing 6 a spring 17 is coiled around the guard, said spring, by its expansion, tending to hold the casing toward the outer end of the guard whereby the wedging surface 11 of the casing will engage a ball or series of balls 18 mounted in sockets 19 in the guard whereby said balls will be caused to engage an annular groove 20 in the pin near the point of the same.

In the use of the device, the pin is engaged through the garment or article to be secured in the usual manner and the point is permitted to project through the article. The guard and casing are then slipped axially over the pin point so that the balls 18 will ride into engagement with the groove 20 of the pin, as shown in Fig. 2, and the parts will assume such position that withdrawal of the pin point from the guard cannot be accidentally effected, the pin being, consequently, retained in the garment held by it and the point of the pin being completely housed so that it cannot prick or scratch the user. When it is desired to withdraw the pin, the operator grasps the guard with his fingers and presses upon the outer end of the casing so that the casing will move longitudinally of the guard in opposition to the force of the spring 17, thereby compressing the spring and moving the casing to such position that its wedging surface will be beyond the guard, whereupon a slight outward pull upon the guard will withdraw it from the pin, the locking balls 18 being free to move radially outward in their respective sockets 19 inasmuch as the wedging surface 11 has been moved beyond the radial plane of the balls. The chain or guard retainer 5 effectually prevents the guard and casing being completely separated from or detached from the pin so that loss of the same cannot occur.

My improved device may be used in any place where the ordinary safety pin now in common use may be employed and may be employed as a scarf pin retainer inasmuch as it is attractive in design and may be readily produced in the precious metals at a cost which is not prohibitive. The shape of the sockets 19 is such that the balls 18 cannot drop through the same into the bore of the guard 9 and, when the device has been applied to the pin point, the expansion of the spring 17 holds the casing toward the outer end of the guard and, consequently, brings the surface 11 into binding engagement with the locking balls so that they will be positively held in the groove 20 of the pin.

Having thus described the invention, what is claimed as new is:

A safety pin having an annular groove and forming a tapering point beyond said groove, a guard having a tapering head and a closed outer end and an axial bore being provided in said guard, a shoulder in said bore providing an abutment for the tapering sides of the pin point, said head having a radially extending socket opening into said bore, a locking ball loosely mounted in said socket and having greater diameter than the length of said socket, a casing provided with a tapering side wall slidably fitted around the guard and having inturned end flanges integral therewith forming an opening at each end, said closed outer end engaging in one of said openings, a washer around said closed outer end abutting against the adjacent one of said flanges, and a compression spring in said casing inserted between said washer and said head compelling said ball when engaging with said tapering wall to enter said annular groove while said shoulder simultaneously engages said tapering pin point.

In testimony whereof I affix my signature.

MAGNUS A. JOHNSON. [L. S.]